Oct. 8, 1935.  E. A. NELSON  2,016,871
BRAKE DRUM
Filed Aug. 2, 1934
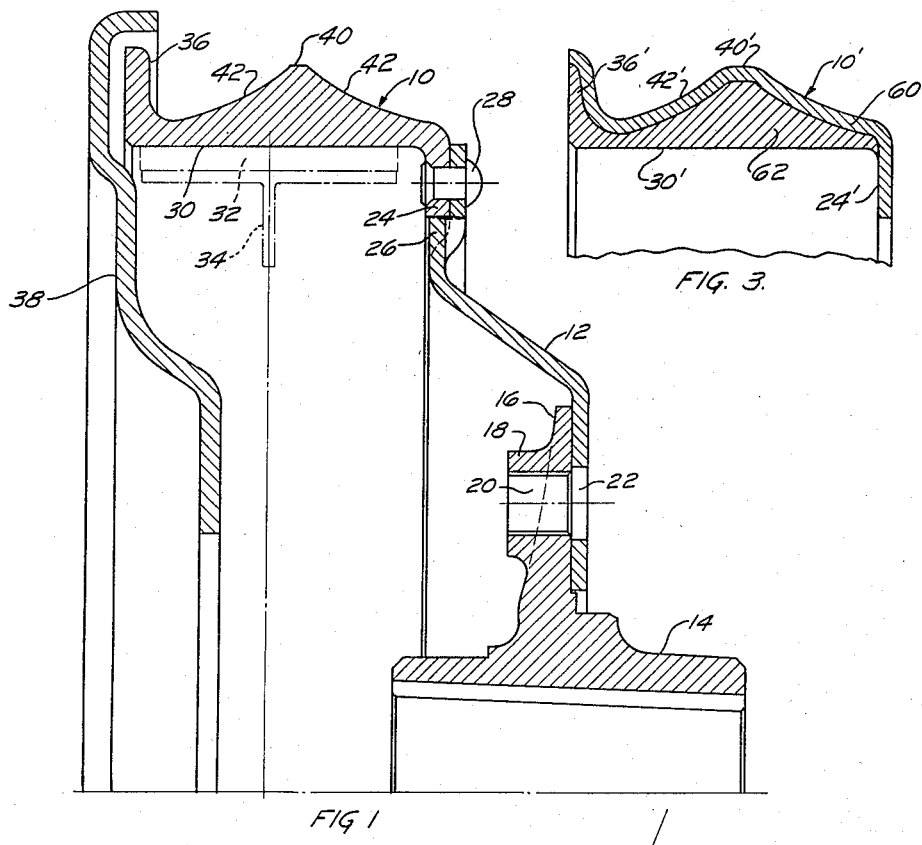
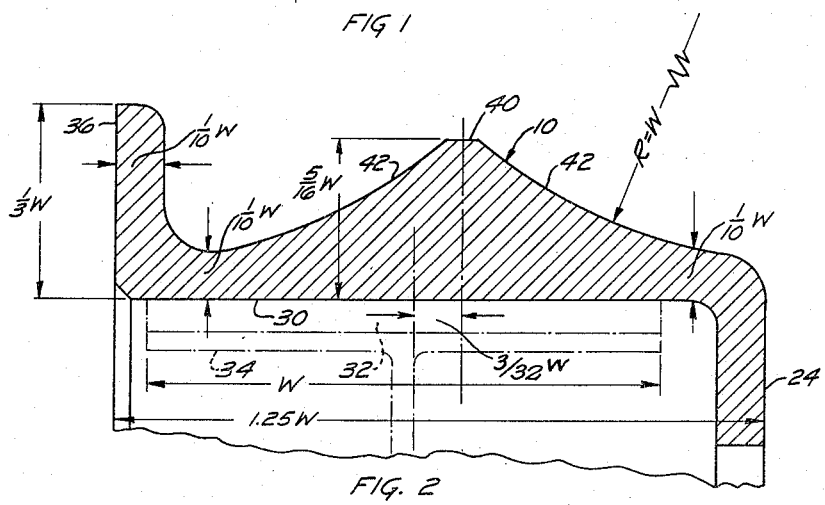
INVENTOR.
EMIL A. NELSON
BY Sturness, Dickey, Pierce & Hann
ATTORNEYS.

Patented Oct. 8, 1935

2,016,871

UNITED STATES PATENT OFFICE 2,016,871

BRAKE DRUM

Emil A. Nelson, Lansing, Mich., assignor to Motor Wheel Corporation, a corporation of Michigan Application August 2, 1934, Serial No. 738,035

8 Claims. (Cl. 188—218)

The invention relates to brake drums, and is particularly adaptable to that type thereof employed in connection with motor vehicles, the principal object being the provision of a brake drum that will not become distorted in use due to heating caused by engagement with the friction element of the cooperating brake mechanism.

Objects of the invention include the provision of a brake drum, the exterior surface of which will have an even temperature throughout under the heating effect of brake applications; the provision of a brake drum which will not bell-mouth either under the influence of internal pressure during brake applications or under the influence of heating thereof caused by brake applications; the provision of a brake drum in which maximum the provision of the material employed is made by a proper distribution of the material for strength, heat absorption and heat dissipating qualities; and the provision of a brake drum as above described which may be formed by the use of conventional and common brake drum materials and methods of fabrication.

The above being among the objects of the present invention the same consists of certain novel features of construction and combination of the parts will be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary, sectional view taken axially through a brake drum and cooperating backing plate, Fig. 2 is an enlarged, fragmentary, transverse sectional view through the brake ring only of the construction shown in Fig. 1, Fig. 3 is a view similar to Fig. 2, but showing a modified form of construction on a reduced scale.

As it is well understood in the art, the present day trend of modern automobile practice is toward smaller wheels and higher speeds. This in turn requires the use of brakes having smaller drums and therefore requires the employment of brake mechanisms having increased efficiency as compared to the older structures. The increased effectiveness of the braking mechanism as a whole requires the employment of higher unit pressures between the friction elements and the braking surface of the brake drum, and this in turn requires that the brake drum be so constructed as to resist deformation under the high internal pressures of the brake elements.

The work required to bring a moving motor vehicle to a stop is, of course, transmitted in the form of heat to the brake drum, and particularly upon a severe application of the brakes at high speed the drums become highly heated. Obviously the employment of smaller drums has the tendency of subjecting the brake drums to a higher heat than in the larger structures. In constructions as heretofore proposed, this heating of the brake drums has resulted in distortion of the drum, usually resulting in bell-mouthing of the drum or other variations in its true or desired contour so that the proper engagement of the friction linings with the braking surface of the drums is disturbed, resulting in localized areas of high pressure and temperature between the drum and the friction elements, and resulting scoring of the drum and destruction of the lining, squealing of the brakes and general inefficiency of the brakes when such conditions obtain.

It has been found experimentally that if the temperature of the exterior surface of a brake drum is maintained at the same value over the entire area thereof, while the drum will expand under the influence of the heat, the braking surface will not become distorted, and accordingly will maintain proper engaging relationship with its friction elements and overcome the disadvantages so prevalent in conventional construction. Accordingly, it will be understood that the present invention provides a brake drum so constructed and arranged as to withstand the application of relatively high braking pressures without distortion of the true cylindrical form of the braking surface thereof, and is further so constructed and arranged that the temperature of the brake drum under the influence of braking actions will be equal throughout all areas of the exterior surface thereof, and consequently distortion of the true cylindrical form of the braking surface will be prevented due to increase in temperature of the drum.

It will be understood that the principles of the present invention are applicable to brake drums regardless of whether they are of composite or integral construction, and while only two modifications of the present invention in this respect are illustrated in the accompanying drawing, the application of the invention to other forms or structures will be apparent to those skilled in the art in view of the following disclosure.

Referring to the drawing, a brake drum is shown as comprising a rim portion indicated generally at 10 and a web portion 12, the latter being mounted upon a wheel hub member 14 provided with a peripheral flange 16 against the side face of which the inner margin of the web 12 abuts. Circumferentially spaced bosses 18 are provided around the inner face of the flange 16 in accordance with the conventional practice and each is provided with an opening 20 therein registering with an opening 22 in the web 12 for the purpose of receiving suitable securing means (not shown) for fixing the drum to the hub. Although in the broader aspects of the present invention, the web 12 and rim 10 may be formed integrally with each other as by being simultaneously cast, for instance, in Figs. 1 and 2, rim 10 is shown as being of cast construction and the web 12 of pressed metal construction. Accordingly, the rim 10 at the closed side or end of the drum is provided with a radially inwardly projecting annular flange 24 the outer side face of which abuts against the inner side face of the outer marginal edge of the web 12, and lugs 26 are struck inwardly at intervals adjacent the outer margin of the web 12 for engagement with the radially inner edge of the flange 24 to thus centrally pilot the rim 10 with respect to the web 12. Any suitable means may be provided for securing the rim 10 and web 12 together, rivets 28 being shown by way of illustration.

The rim 10 has a cylindrical inner brake surface 30 against which the friction lining 32 of a brake element 34, shown in the form of a conventional brake shoe, is adapted to be forced upon application of the brake in accordance with well understood practice. The rim 10 at the open end of the drum is provided with a radially outwardly extending annular flange 36. A backing plate 38 is provided at the open end of the drum in accordance with conventional practice for closing such end against the entrance of dust, dirt or other foreign material as well as to support the brake element 34 and co-operating parts, the outer marginal edge of the backing plate 38 preferably being formed in the manner indicated to hood the flange 36 and thereby enhance the sealing effect of the backing plate against the entrance of foreign material to the interior of the drum.

It will be noted that the thickness of the rim 10 varies between its opposite ends or edges, it being of minimum thickness closely adjacent the flanges 24 and 36 and increasing in thickness generally towards its center so as to form what may be termed a rib 40 on its outer face and which rib is centrally offset with respect to the mid-point of length of the drum as will hereinafter be more fully brought out. The rib 40 is continuous circumferentially of the drum and its sides are curved as at 42, in concave relation, from its point of maximum thickness to the areas of minimum thickness of the rim 10.

As previously brought out, this brake drum and particularly the rim portion thereof has been designed to withstand the expansive pressures of the brake elements during braking operations without distortion, but further has been particularly designed to maintain an equal temperature of the exterior surface of the rim portion over all areas thereof due to the heat absorbed by the drum during braking applications, thereby preventing such heat from distorting the braking surface 30. These last features are obtained by the particular disposition and arrangement of the metal in the rim 10 in the manner indicated and as hereinafter will be specifically explained in connection with the description of Fig. 2, it being understood, however, that from a practical standpoint the specific relation of the various dimensions may vary within reasonable limits and the desired characteristics of the drum explained obtained to a greater or lesser degree.

Referring now to Fig. 2, the width of the brake lining 32 is indicated at W, and this dimension is taken as the constant for calculating the various dimensions of the rim portion of the brake drum. As indicated in Fig. 2 the over-all length of the rim portion 10 of the drum is preferably approximately 1.25 W. The minimum thickness of the drum as occurring in the areas adjacent to the flanges 24 and 36, as well as the flange 36, is approximately $\frac{1}{10}$ W. The thickness of the rim 10 centrally of the rib 40 is approximately $\frac{1}{8}$ W, and the radius of the curved concave sides 42 of the rib 40 is approximately equal to the width of the lining 32, or W. It will, of course, be understood that suitable radius is provided between the side 42 adjacent the flange 36 and the inner face of the flange 36, for structural and other reasons, and a similar radius is preferably provided between the brake surface 30 and the inner face of the flange 24 or inner side of the web 12 as the case may be, depending upon whether the web 12 is formed integrally with or separately from the rim 10. The centerline of the rib 40 is preferably offset inwardly towards the closed end of the drum from the mid-point of width of the braking surface 30 by a distance approximately equal to $\frac{1}{32}$ W.

It has been found that with the disposition of the metal of the rim 10 as shown and described, the rim 10 will be of sufficient rigidity when constructed of the metals and in the manner usually employed in connection with the construction of such brake drums, that the expansive pressures of the brake shoe 34 or other braking elements in the application of the brake will not cause distortion of the drum, and particularly it has been found that because of the disposition of the metal in the rim 10 as the drum is heated due to braking applications, the flow of heat between different parts of the drum and the transfer of the heat from the drum to the surrounding air will be such that the temperature of the exterior surface of the rim portion 10 over substantially all areas thereof will be equal, and that in expanding the rim 10 will expand evenly and maintain the true circular formation of the braking surface 30. This, of course, insures full contact between the friction lining 32 and the braking surface 30, distributing the braking effort over the entire area of the lining 32 and thus prevent the occurrence of limited areas of high pressure between the braking elements and the braking surface, which is the most common cause of scored drums and squealing and inefficient brakes in most conventional constructions.

As previously mentioned, the particular material from which the brake drum and particularly the rim 10 is constructed is more or less unimportant as far as the present invention is concerned as long as such material is adaptable for the use intended, and additionally the method of constructing the rim member 10 is also more or less unimportant as long as the particular disposition of metal as suggested in connection with Fig. 2 is approximately maintained. For instance, in Fig. 3 is illustrated the application of the present invention to a well known method of making brake drums. In Fig. 3, the rim portion of the brake drum is illustrated at 10' and as comprising an outer sheet metal part 60 and an inner cast metal part 62. These parts cooperate to form a rim 10' having the same general disposition of metal as explained in connection with Fig. 2, and the various parts of which are indicated by the same numerals as in the previous figure, except that they bear a prime mark. As in the previous construction, the flange 24' may be formed separately from and attached to the web portion of the brake drum, or the web portion may be formed integrally with the rim portion 10. Such brake drum constructions are conventionally formed by heating the sheet metal part 60 and causing it to be rotated in a suitable apparatus, and pouring molten cast iron of suitable composition into the interior thereof so as to form the portion 62. The portion 60 is preferably heated to such temperature and the temperature of the molten cast iron which is poured thereinto to form the portion 62 is preferably such that a fusion will occur between the cast iron and the portion 60, not only to securely fix these parts together in the final product but also to insure a high degree of thermal conductivity between them.

Formal changes may be made in the specific embodiment of the invention described without departing from the spirit or the substance of the broad invention, the scope of which is commensurate with the appended claims.

I claim:

1. A brake drum rim having an inner cylindrical surface adapted for engagement with a friction element, a radially outwardly extending annular flange at its open end, a radially inwardly extending annular part at its inner end, and a rib-like projection between said ends, the thickness of said rim centrally of said rib-like projection being approximately equal to five-sixteenths of the width of said friction element, and the side surfaces of said rib being concave and substantially corresponding to an arc of circle in cross-sectional view.

2. A brake drum including a rim portion having an internal cylindrical braking surface adapted for contact with a friction element, said rim portion having a radially outwardly directed annular flange at one end and a generally radially inwardly extending annular portion at its opposite end, and a circumferentially extending rib-like portion on its outer face between said ends, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve.

3. A brake drum including a rim portion having an internal cylindrical braking surface adapted for contact with a friction element, said rim portion being approximately 1.25 times the width of said element in length and having a radially outwardly directed annular flange at one end and a generally radially inwardly extending annular portion at its opposite end, and a circumferentially extending rib like portion on its outer face between said ends, the height of said flange as measured from said surface being approximately one-third the width of said element and the thickness thereof being aproximately one-tenth the width of said lining, the thickness of said rim-portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portions merging into said areas in a smooth curve.

4. A brake drum including a rim portion having an internal cylindrical braking surface adapted for contact with a friction element, said rim portion having a radially outwardly directed annular flange at one end and a generally radially inwardly extending annular portion at its opposite end, and a circumferentially extending rib-like portion on its outer face, the centerline of said rib-like portion being positioned closer to that end of said rim portion having said annular portion than to that end thereof having said flange, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve.

5. A brake drum including a rim portion having an internal cylindrical braking surface adapted for contact with a friction element, said rim portion having a radially outwardly directed annular flange at one end and a generally radially inwardly extending annular portion at its opposite end, and a circumferentially extending rib-like portion on its outer face between said ends, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve of a radius approximately equal to the width of said element.

6. A brake drum including a rim portion having an internal cylindrical braking surface adapted for contact with a friction element, said rim portion having a radially outwardly directed annular flange at one end and a generally radially inwardly extending annular portion at its opposite end, and a circumferentially extending rib-like portion on its outer face, the center line of said rib-like portion being positioned closer to that end of said rim portion having said annular portion than to that end thereof having said flange from the center line of said braking surface by a distance approximately equal to three thirty-seconds of the width of said element, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve.

7. A brake drum including a rim portion having an internal cylindrical braking surface adapted for contact with a friction element, said rim portion being approximately 1.25 times the width of said element in length and having a radially outwardly directed annular flange at one end and a generally radially inwardly extending annular portion at its opposite end, and a circumferentially extending rib-like portion on its outer face between said ends, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve of a radius approximately equal to the width of said element.

8. A brake drum including a rim portion having an internal cylindrical braking surface adapted for contact with a friction element, said rim portion being approximately 1.25 times the width of said element in length and having a radially outwardly directed annular flange at one end and a generally radially inwardly extending annular portion at its opposite end, and a circumferentially extending rib-like portion on its outer face between said ends, the centerline of said rib-like portion being positioned closer to that end of said rim portion having said annular portion than to that end thereof having said flange from the center line of said braking surface by a distance approximately equal to three thirty-seconds of the width of said element, the height of said flange as measured from said surface being approximately one-third the width of said element and the thickness thereof being approximately one-tenth the width of said lining, the thickness of said rim portion centrally of said rib-like portion being approximately five-sixteenths of the width of said element, the thickness of said rim portion in the areas next adjacent said flange and said inwardly extending annular portion being approximately one-tenth the width of said element, and the sides of said rib-like portion merging into said areas in a smooth curve of a radius approximately equal to the width of said element.

EMIL A. NELSON.